United States Patent
Hsiao et al.

(10) Patent No.: US 9,565,418 B2
(45) Date of Patent: Feb. 7, 2017

(54) DECODING METHOD AND DECODING APPARATUS FOR USING PARALLEL PROCESSING SCHEME TO DECODE PICTURES IN DIFFERENT BITSTREAMS AFTER REQUIRED DECODED DATA DERIVED FROM DECODING PRECEDING PICTURE(S) IS READY

(71) Applicant: MEDIATEK INC., Hsin-Chu (TW)

(72) Inventors: Te-Chi Hsiao, Hsinchu (TW); Yung-Chang Chang, New Taipei (TW); Ching-Chieh Wang, Yilan County (TW); Shih-Hung Lin, Hsinchu (TW); Chi-Cheng Ju, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 675 days.

(21) Appl. No.: 14/035,962

(22) Filed: Sep. 25, 2013

(65) Prior Publication Data

US 2014/0022344 A1    Jan. 23, 2014

Related U.S. Application Data

(63) Continuation of application No. 12/897,802, filed on Oct. 5, 2010, now Pat. No. 8,570,361.

(Continued)

(51) Int. Cl.
*H04N 7/18* (2006.01)
*H04N 13/00* (2006.01)
(Continued)

(52) U.S. Cl.
CPC .......... *H04N 13/0048* (2013.01); *H04N 19/44* (2014.11); *H04N 19/597* (2014.11); *H04N 21/234327* (2013.01); *H04N 19/30* (2014.11)

(58) Field of Classification Search
CPC .............. G06K 9/40; H04N 1/32; H04N 1/41; H04N 19/159; H04N 19/176; H04N 19/86; H04N 19/82; H04N 19/117; H04N 19/139

(Continued)

(56) References Cited

U.S. PATENT DOCUMENTS 8,897,591 B2 * 11/2014 Wilkins ................. H04N 19/50 358/426.01
8,938,012 B2 * 1/2015 Wang ....................... 375/240.26

(Continued)

FOREIGN PATENT DOCUMENTS

CN    1893608 A    1/2007
CN    1938727 A    3/2007

(Continued)

*Primary Examiner* — Andy Rao
(74) *Attorney, Agent, or Firm* — Winston Hsu; Scott Margo

(57) ABSTRACT

An exemplary decoding method of an input video bitstream including a first bitstream and a second bitstream includes: decoding a first picture in the first bitstream; after a required decoded data derived from decoding the first picture is ready for a first decoding operation of a second picture in the first bitstream, performing the first decoding operation; and after a required decoded data derived from decoding the first picture is ready for a second decoding operation of a picture in the second bitstream, performing the second decoding operation, wherein a time period of decoding the second picture in the first bitstream and a time period of decoding the picture in the second bitstream are overlapped in time.

24 Claims, 10 Drawing Sheets

Related U.S. Application Data

(60) Provisional application No. 61/293,769, filed on Jan. 11, 2010.

(51) Int. Cl.
*H04N 21/2343* (2011.01)
*H04N 19/597* (2014.01)
*H04N 19/44* (2014.01)
*H04N 19/30* (2014.01)

(58) Field of Classification Search
USPC ........................................ 375/240.11–240.29
See application file for complete search history.

(56) References Cited

U.S. PATENT DOCUMENTS

| | | |
|---|---|---|
| 2008/0089412 A1 | 4/2008 | Ugur |
| 2008/0089428 A1 | 4/2008 | Nakamura |
| 2009/0002379 A1 | 1/2009 | Baeza |

FOREIGN PATENT DOCUMENTS

| | | |
|---|---|---|
| CN | 101754037 A | 6/2010 |
| WO | 2008047300 A2 | 4/2008 |
| WO | 2009108028 A1 | 9/2009 |

\* cited by examiner

DECODING METHOD AND DECODING APPARATUS FOR USING PARALLEL PROCESSING SCHEME TO DECODE PICTURES IN DIFFERENT BITSTREAMS AFTER REQUIRED DECODED DATA DERIVED FROM DECODING PRECEDING PICTURE(S) IS READY

CROSS REFERENCE TO RELATED APPLICATIONS

This is a continuation application of co-pending U.S. application Ser. No. 12/897,802 (filed on Oct. 5, 2010), which claims the benefit of U.S. Provisional Application No. 61/293,769 (filed on Jan. 11, 2010). The entire contents of the related applications are incorporated herein by reference.

BACKGROUND

The disclosed embodiments of the present invention relate to decoding an input video bitstream, and more particularly, to a decoding method and decoding apparatus capable of using a parallel processing scheme to decode pictures in different bitstreams included in an input video bitstream after a required decoded data derived from preceding picture(s) is ready.

Three-dimensional (3D) video presentation technology is developed to improve the viewing entertainment of the end-users. For example, 3D glasses and 3D display devices are devised to realize the playback of the 3D video content. Regarding the 3D video content, it is commonly generated by using different cameras to thereby capture pictures of different views. The captured pictures of different views are then encoded to generate a plurality of bitstreams respectively corresponding to different views. In regard to a conventional decoding procedure, a sequential processing scheme is generally employed to decode the pictures one by one according to a decoding order, thereby generating reconstructed pictures of different views. However, such a decoding procedure using the sequential processing scheme is quite inefficient.

SUMMARY

In accordance with exemplary embodiments of the present invention, a decoding method and decoding apparatus capable of using a parallel processing scheme to decode pictures in different bitstreams included in an input video bitstream after a required decoded data derived from preceding picture(s) is ready are proposed to solve the above-mentioned problem.

According to a first aspect of the present invention, an exemplary decoding method of an input video bitstream including a first bitstream and a second bitstream is proposed. Each of the first bitstream and the second bitstream contains a plurality of pictures. The exemplary decoding method includes: decoding a first picture in the first bitstream; after a required decoded data derived from decoding the first picture is ready for a first decoding operation of a second picture in the first bitstream, performing the first decoding operation; and after a required decoded data derived from decoding the first picture is ready for a second decoding operation of a picture in the second bitstream, performing the second decoding operation, wherein a time period of decoding the second picture in the first bitstream and a time period of decoding the picture in the second bitstream are overlapped in time.

According to a second aspect of the present invention, an exemplary decoding apparatus of an input video bitstream including a first bitstream and a second bitstream is proposed. Each of the first bitstream and the second bitstream contains a plurality of pictures. The exemplary decoding apparatus includes an input storage, an output storage, and a decoding circuit. The input storage is for storing the input video bitstream. The output storage is for storing a decoded result of the input video bitstream. The decoding circuit is coupled to the input storage and the output storage, and used for decoding a first picture in the first bitstream; after a required decoded data derived from decoding the first picture is ready for a first decoding operation of a second picture in the first bitstream, performing the first decoding operation; and after a required decoded data derived from decoding the first picture is ready for a second decoding operation of a picture in the second bitstream, performing the second decoding operation. A time period of decoding the second picture in the first bitstream and a time period of decoding the picture in the second bitstream are overlapped in time.

According to a third aspect of the present invention, an exemplary decoding method of an input video bitstream including a first bitstream and a second bitstream is proposed. Each of the first bitstream and the second bitstream contains a plurality of pictures. The exemplary decoding method includes: decoding a first picture in the first bitstream; decoding a first picture in the second bitstream; after a required decoded data derived from decoding the first picture in the first bitstream and the first picture in the second bitstream is ready for a first decoding operation of a second picture in the first bitstream, performing the first decoding operation; and after a required decoded data derived from decoding the first picture in the first bitstream and the first picture in the second bitstream is ready for a second decoding operation of a second picture in the second bitstream, performing the second decoding operation. A time period of decoding the second picture in the first bitstream and a time period of decoding the second picture in the second bitstream are overlapped in time.

According to a fourth aspect of the present invention, an exemplary decoding apparatus of an input video bitstream including a first bitstream and a second bitstream is proposed. Each of the first bitstream and the second bitstream contains a plurality of pictures. The exemplary decoding apparatus includes an input storage, an output storage, and a decoding circuit. The input storage is for storing the input video bitstream. The output storage is for storing a decoded result of the input video bitstream. The decoding circuit is coupled to the input storage and the output storage, and used for decoding a first picture in the first bitstream; decoding a first picture in the second bitstream; after a required decoded data derived from decoding the first picture in the first bitstream and the first picture in the second bitstream is ready for a first decoding operation of a second picture in the first bitstream, performing the first decoding operation; and after a required decoded data derived from decoding the first picture in the first bitstream and the first picture in the second bitstream is ready for a second decoding operation of a second picture in the second bitstream, performing the second decoding operation. A time period of decoding the second picture in the first bitstream and a time period of decoding the second picture in the second bitstream are overlapped in time.

These and other objectives of the present invention will no doubt become obvious to those of ordinary skill in the art

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to employ a parallel processing scheme to speed up the decoding procedure of an input video bitstream including at least a first bitstream and a second bitstream. For example, the first bitstream is decoded without referencing decoded data derived from decoding the second bitstream, and the second bitstream is decoded by referencing decoded data derived from decoding the first bitstream. In one exemplary embodiment, the first bitstream contains pictures of a first view for a three-dimensional (3D) video presentation, and the second bitstream contains pictures of a second view for the 3D video presentation. Specifically, the input video bitstream complies with a multi-view coding (MVC) standard. Further details are described as follows.

Figure 1:
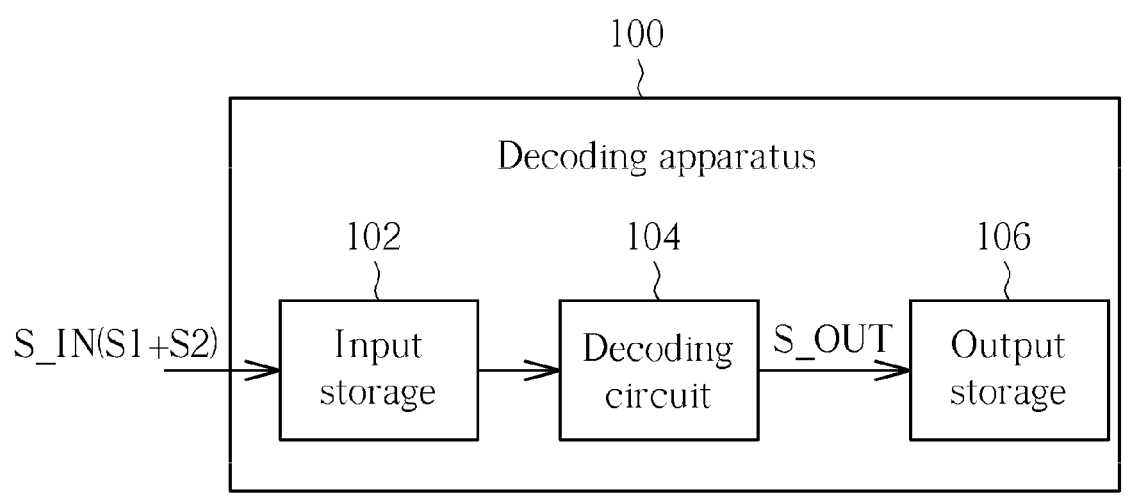
FIG. 1 is a block diagram illustrating a decoding apparatus according to an exemplary embodiment of the present invention.
Figure 2:
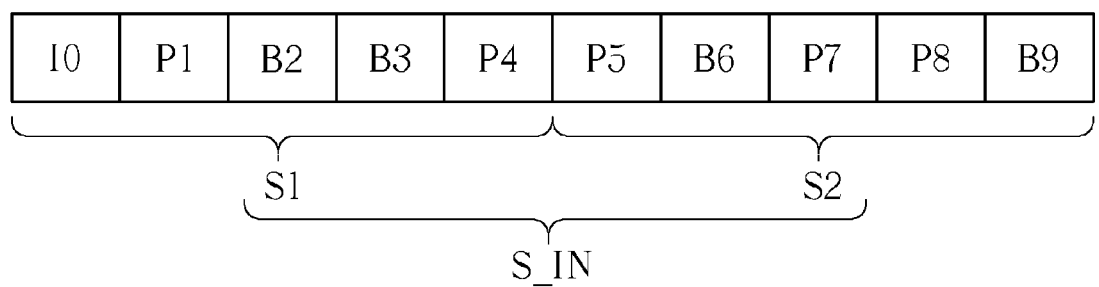
FIG. 2 is a diagram illustrating an example of an input video bitstream.

FIG. 1 is a block diagram illustrating a decoding apparatus according to an exemplary embodiment of the present invention. The exemplary decoding apparatus 100 includes, but is not limited to, an input storage 102, a decoding circuit 104, and an output storage 106. The decoding apparatus 100 is used to decode an input video bitstream S_IN including at least a first bitstream S1 and a second bitstream S2. Each of the first bitstream S1 and the second bitstream S2 contains a plurality of pictures to be decoded. FIG. 2 is a diagram illustrating an example of the input video bitstream S_IN. As shown in FIG. 1, the first bitstream S1 includes an intra-coded picture (I-picture) I0, a plurality of predicted pictures (P-pictures) P1 and P4, and a plurality of bi-predictive pictures (B-pictures) B2 and B3, and the second bitstream S2 includes a plurality of P-pictures P5, P7 and P8, and a plurality of B-pictures B6 and B9. According to the exemplary input order, the pictures I0, P1, B2, B3, P4, P5, B6, P7, P8, and B9 are transmitted via the input video bitstream S_IN sequentially. In this exemplary embodiment, the decoding of the first bitstream S1 does not depend upon the decoded data generated from decoding the second bitstream S2; however, the decoding the second bitstream S2 depends upon decoded data generated from decoding the first bitstream S1. By way of example, but not limitation, the input video bitstream S_IN complies with the MVC standard, where the first bitstream S1 carrying pictures of a first view for a 3D video presentation may be termed the base-view bitstream due to its independent decoding characteristic, and the second bitstream S2 carrying pictures of a second view for the 3D video presentation may be termed the dependent-view bitstream due to its dependent decoding characteristic. However, this is for illustrative purposes only, and is not meant to be a limitation of the present invention. That is, the proposed exemplary decoding scheme employed by the decoding circuit 104 can be applied to any input bitstream with different bitstreams respectively having the independent decoding characteristic and the dependent decoding characteristic and/or respectively containing pictures of different views for a 3D video presentation.

Figure 3:
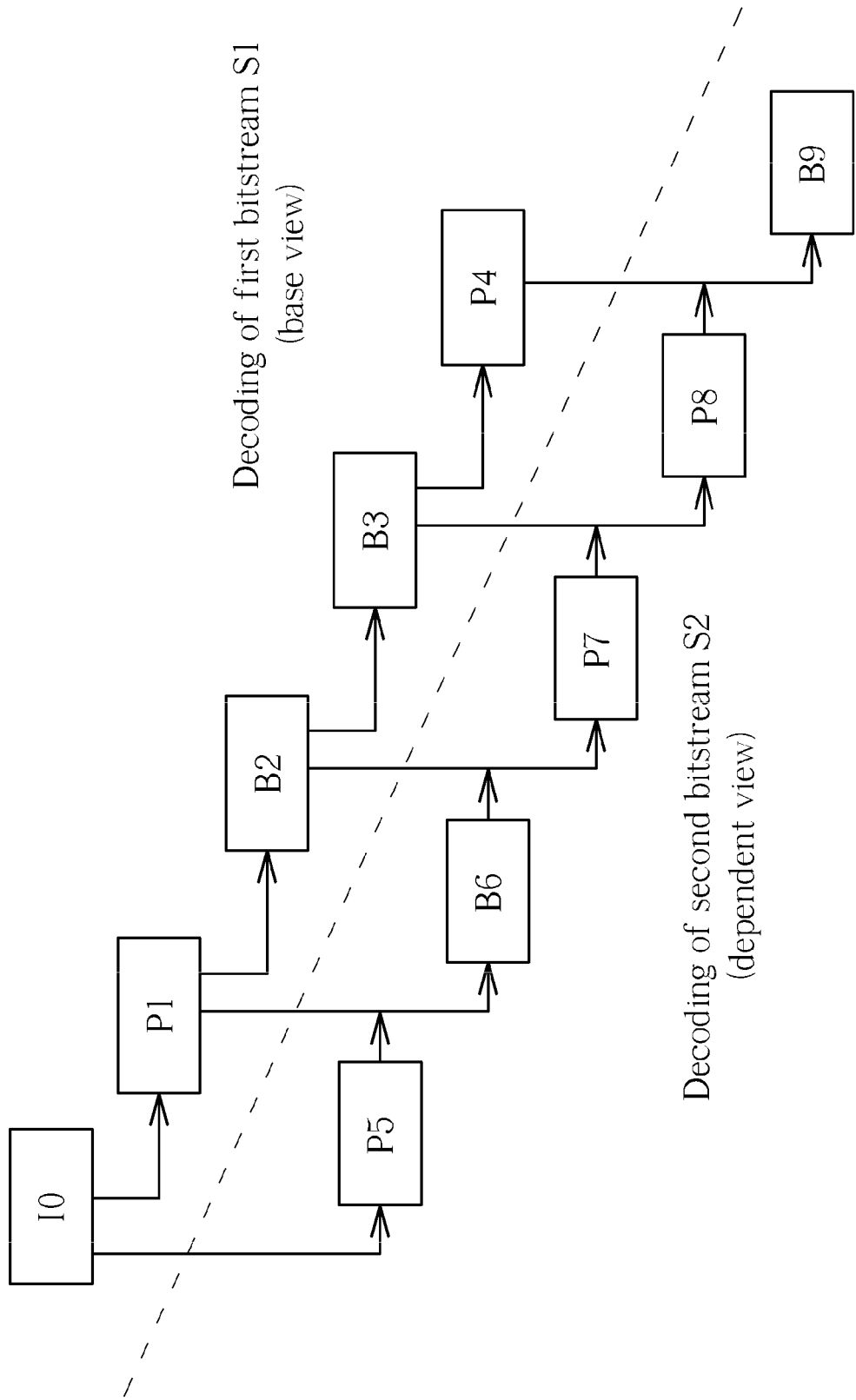
FIG. 3 is a diagram illustrating a decoding order of pictures transmitted by a first bitstream and a second bitstream included in an input video stream.

The input storage 102 is used for storing the input video bitstream S_IN. The output storage 106 is used for storing a decoded result S_OUT of the input video bitstream S_IN. The decoding circuit 104 is coupled between the input storage 102 and the output storage 106, and used for decoding the input video bitstream S_IN buffered via the input storage 102 and accordingly generating the decoded result S_OUT which contains reconstructed pictures of different views to the output storage 106. Please refer to FIG. 3, which is a diagram illustrating a decoding order of the pictures transmitted by the first bitstream S1 and the second bitstream S2. As mentioned above, the decoding of the first bitstream S1 does not depend upon the decoded data generated from decoding the second bitstream S2, and the decoding of the second bitstream S2 depends upon decoded data generated from decoding the first bitstream S1. Regarding the decoding of the first bitstream S1, the decoding of the P-picture P1 may refer to a decoded data derived from decoding the I-picture I0, the decoding of the B-picture B2 may refer to a decoded data derived from decoding the P-picture P1, the decoding of the B-picture B3 may refer to a decoded data derived from decoding the B-picture B2, and the decoding of the P-picture P4 may refer to a decoded data derived from decoding the B-picture B3. Regarding the decoding of the second bitstream S2, the decoding of the P-picture P5 may refer to a decoded data derived from decoding the I-picture I0, the decoding of the B-picture B6 may refer to a decoded data derived from decoding the P-pictures P1 and P5, the decoding of the P-picture P7 may refer to a decoded data derived from decoding the B-pictures B2 and B6, the decoding of the P-picture P8 may refer to a decoded data derived from decoding the B-picture B3 and the P-picture P7, and the decoding of the B-picture B9 may refer to a decoded data derived from decoding the P-pictures P4 and P8. One technical feature of the present invention is that the decoding circuit 104 may employ a parallel processing scheme when decoding one picture in the first bitstream (e.g., a base-view bitstream) S1 and another picture in the second bitstream (e.g., a dependent-view bitstream) S2. For example, the decoding circuit 104 first decodes the I-picture I0 in the first bitstream S1. After a required decoded data derived from decoding the I-picture I0 is ready for a decoding operation of the P-picture P1 in the first bitstream S1, the decoding circuit 104 performs the decoding operation of the P-picture P1. In addition, after a required decoded data derived from decoding the I-picture I0 is ready for a decoding operation of the P-picture P5 in the second bitstream S2, the decoding circuit 104 performs the decoding operation of the P-picture P5. In this exemplary embodiment, a time period of decoding the P-picture P1 in the first bitstream S1 and a time period of decoding the P-picture P5 in the second bitstream S2 are overlapped in time. In this way, as the parallel processing scheme is applied to decoding the P-pictures P1 and P5, the decoding performance of the P-pictures P1 and P5 can be effectively improved due to the fact that the start of the decoding operation of the P-picture P1 is not required to wait for the end of the decoding operation of the P-picture P5. In one exemplary implementation, the decoding operation of the P-picture P1 and the decoding operation of the P-picture P5 may be started after a complete reconstructed picture is obtained by decoding the I-picture I0. However, this is for illustrative purposes only. That is, as long as the required decoded data derived from decoding the I-picture I0 is ready, either of the decoding operation of the P-picture P1 and the decoding operation of the P-picture P5 can be started.

Regarding the decoding of the following picture(s) in the first bitstream S1 and the second bitstream S2, the parallel processing scheme may still be enabled. In the following description, decoding of the B-pictures B2 and B6 is taken as an example.

After a required decoded data derived from decoding the P-picture P1 in the first bitstream S1 and the P-picture P5 in the second bitstream S2 is ready for a decoding operation of the B-picture B2, the decoding circuit 104 performs the decoding operation of the B-picture B2. In addition, after a required decoded data derived from decoding the P-picture P1 in the first bitstream S1 and the P-picture P5 in the second bitstream S2 is ready for a decoding operation of the B-picture B6, the decoding circuit 104 performs the decoding operation of the B-picture B6. In this exemplary embodiment, a time period of decoding the B-picture B2 in the first bitstream S1 and a time period of decoding the B-picture B6 in the second bitstream S2 are overlapped in time. Similarly, the decoding performance of the B-pictures B2 and B6 can be effectively improved due to the fact that the start of the decoding operation of the B-picture B2 is not required to wait for the end of the decoding operation of the B-picture B6. In one exemplary implementation, the decoding operation of the B-picture B2 may be started after a complete reconstructed picture is obtained by decoding the P-picture P1; additionally, the decoding operation of the B-picture B6 may be started after a complete reconstructed picture is obtained by decoding the P-picture P1 and a complete reconstructed picture is obtained by decoding the P-picture P5. However, this is for illustrative purposes only. That is, as long as the required decoded data derived from decoding the P-pictures P1 and P5 is ready, either of the decoding operation of the B-picture B2 and the decoding operation of the B-picture B6 can be started.

To put it simply, the overall decoding performance of the input video bitstream S_IN is improved as the decoding circuit 104 supports the parallel processing scheme. For clarity, several feasible implementations of the decoding circuit 104 are provided as follows.

Figure 4:
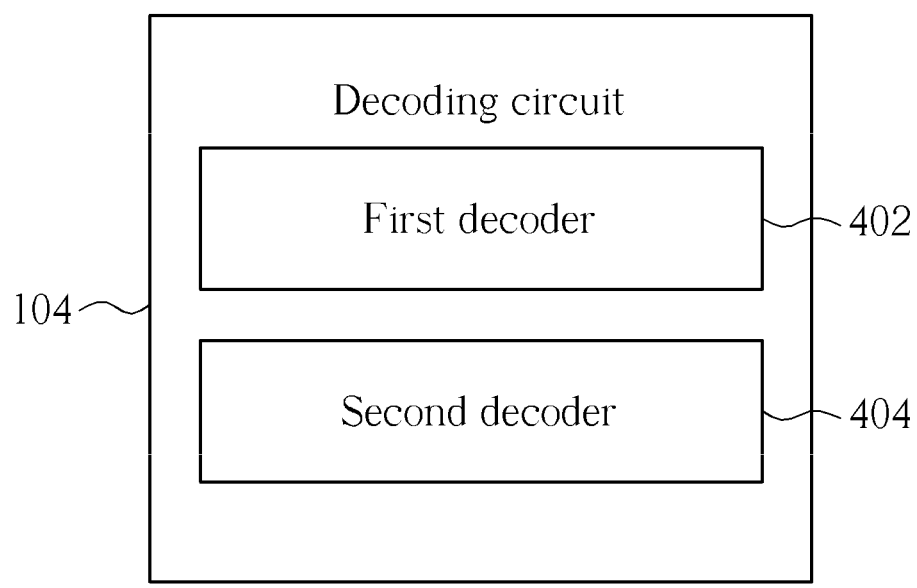
FIG. 4 is a diagram illustrating a first exemplary implementation of a decoding circuit shown in FIG. 1.

FIG. 4 is a diagram illustrating a first exemplary implementation of the decoding circuit 104 shown in FIG. 1. The decoding circuit 104 includes a first decoder 402 and a second decoder 404. For example, after a required decoded data derived from decoding the I-picture I0 is ready for a decoding operation of the P-picture P1 in the first bitstream S1, the first decoder 402 performs the decoding operation of the P-picture P1 to derive a corresponding reconstructed picture; in addition, after a required decoded data derived from decoding the I-picture I0 is ready for a decoding operation of the P-picture P5 in the second bitstream S2, the second decoder 404 performs the decoding operation of the P-picture P5 to derive a corresponding reconstructed picture. Similarly, after a required decoded data derived from decoding the P-pictures P1 and P5 is ready for a decoding operation of the B-picture B2 in the first bitstream S1, the first decoder 402 performs the decoding operation of the B-picture B2 to derive a corresponding reconstructed picture; in addition, after a required decoded data derived from decoding the P-pictures P1 and P5 is ready for a decoding operation of the B-picture B6 in the second bitstream S2, the second decoder 404 performs the decoding operation of the B-picture B6 to derive a corresponding reconstructed picture. As two individual hardware decoders are physically implemented in the decoding circuit 104, the parallel processing scheme can be applied to the decoding operations of one picture in the first bitstream S1 and another picture in the second bitstream S2.

Figure 5:
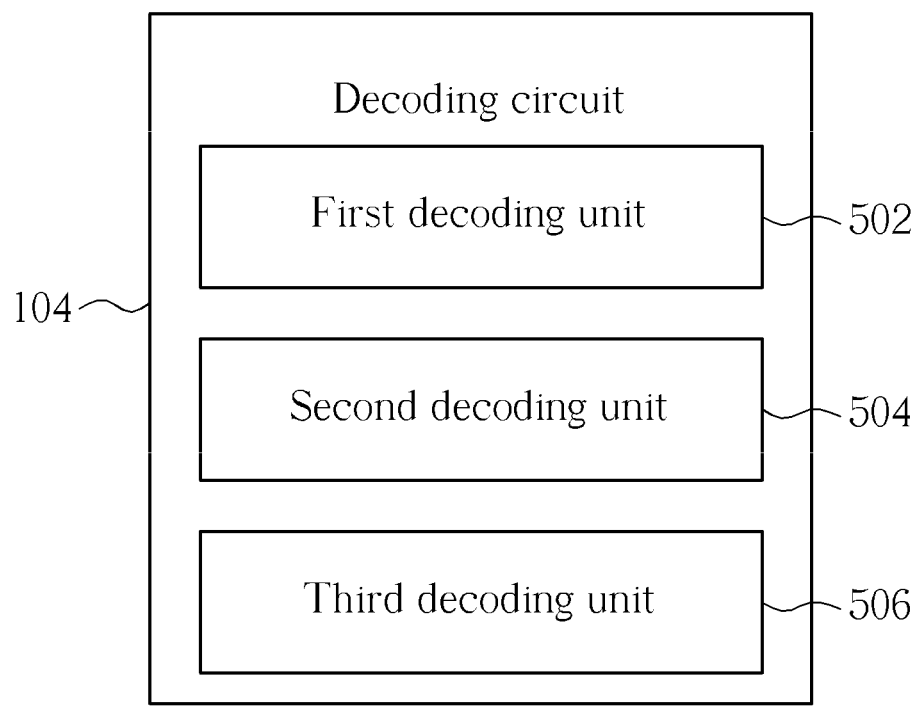
FIG. 5 is a diagram illustrating a second exemplary implementation of the decoding circuit shown in FIG. 1.

FIG. 5 is a diagram illustrating a second exemplary implementation of the decoding circuit 104 shown in FIG. 1. The decoding circuit 104 includes a plurality of decoding units having a first decoding unit 502 dedicated to performing a first decoding function, a second decoding unit 504 dedicated to performing a second decoding function, and a third decoding unit 506 dedicated to performing the same second decoding function. It should be noted that only three decoding units are shown in FIG. 5 for illustrative purposes only. Regarding the decoding operation of the P-picture P1, it may have at least a first decoding step and a second decoding step involved therein. Similarly, regarding the decoding operation of the P-picture P5, it may have at least a third decoding step and a fourth decoding step involved therein. After required decoded data derived from decoding the I-picture I0 is ready for the decoding operations of the P-pictures P1 and P5, the first decoding unit 502 sequentially deals with the first decoding step and the third decoding step by performing the first decoding function, the second decoding unit 504 deals with the second decoding step by performing the second decoding function, and the third decoding unit 506 deals with the fourth decoding step by performing the second decoding function when the second decoding unit 504 deals with the second decoding step.

Consider another case where the decoding operation of the B-picture B2 may have at least a first decoding step and a second decoding step involved therein, and the decoding operation of the B-picture B6 may have at least a third decoding step and a fourth decoding step involved therein. After required decoded data derived from decoding the P-pictures P1 and P5 is ready for the decoding operations of the B-pictures B2 and B6, the first decoding unit 502 sequentially deals with the first decoding step and the third decoding step by performing the first decoding function, the second decoding unit 504 deals with the second decoding step by performing the second decoding function, and the third decoding unit 506 deals with the fourth decoding step by performing the second decoding function when the second decoding unit 504 deals with the second decoding step.

To put it simply, as two individual hardware decoding units dedicated to performing the same function are physically implemented in the decoding circuit 104, the parallel processing scheme can be applied to the decoding operations of one picture in the first bitstream S1 and another picture in the second bitstream S2.

Figure 6:
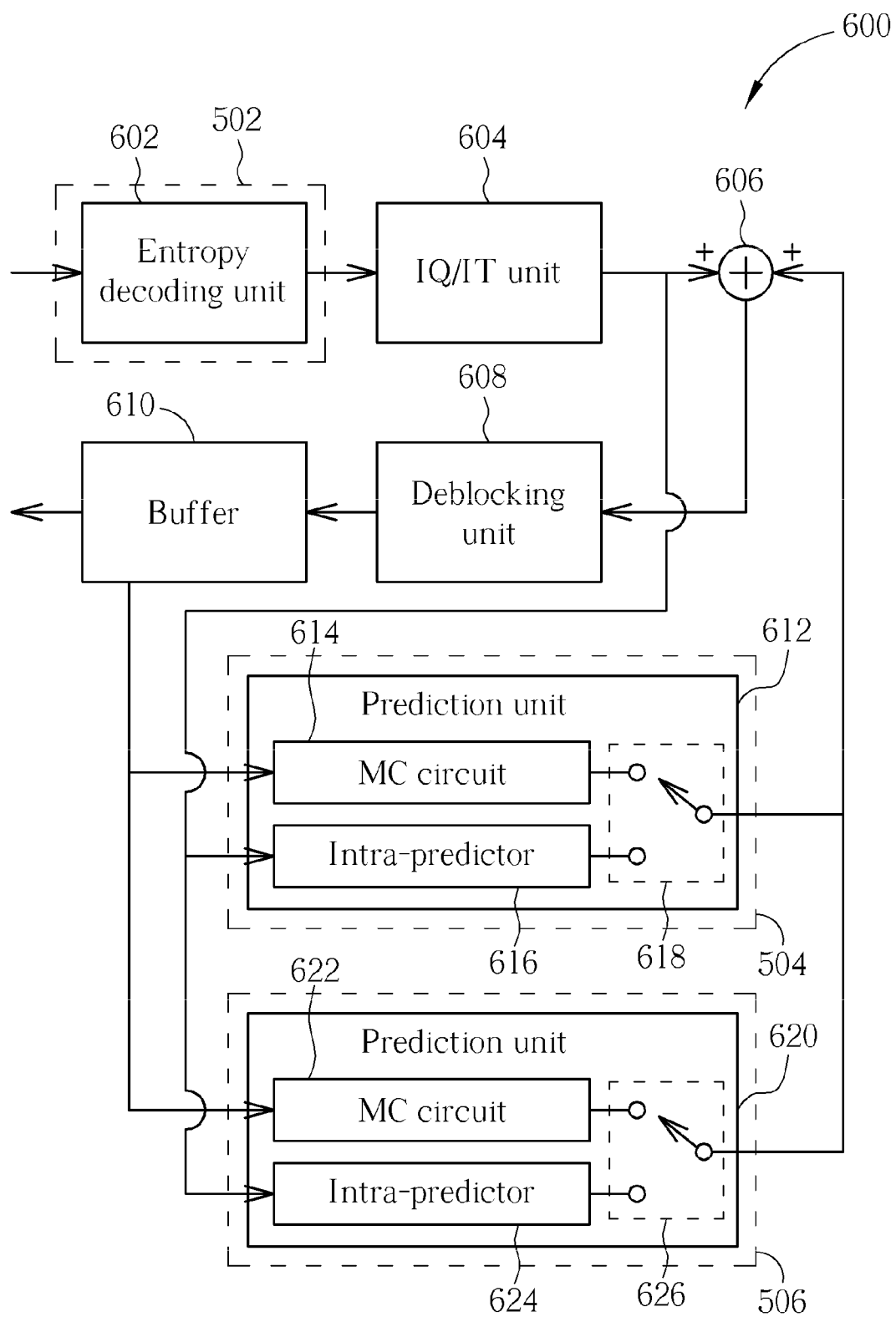
FIG. 6 is a simplified diagram illustrating a first exemplary decoding circuit with the architecture shown in FIG. 5 implemented therein.

FIG. 6 is a simplified diagram illustrating a first exemplary decoding circuit with the architecture shown in FIG. 5 implemented therein. The decoding circuit 600 includes an entropy decoding unit (e.g., a variable length decoder) 602, an inverse quantization/inverse transform (IQ/IT) unit 604, a reconstruction unit 606, a deblocking unit 608, a buffer 610 (which may be integrated in the output storage 106 shown in FIG. 1), and a plurality of prediction units 612 and 620. The prediction unit 612 includes a motion compensation (MC) circuit 614 for inter-prediction, an intra-predictor 616 for intra-prediction, and a multiplexer 618 for selecting one of the outputs generated from the MC circuit 614 and the intra-predictor 616 as its output to the reconstruction unit 606. Similarly, the prediction unit 620 includes an MC circuit 622, an intra-predictor 624, and a multiplexer 626. As a person skilled in the H.264/AVC field can readily understand the operation and function of each block shown in FIG. 6, further description is omitted here for brevity. It should be noted that the prediction unit 620 is a duplicate of the prediction unit 612. The major difference between the decoding circuit 600 and the conventional decoder is the implementation of multiple prediction units within the decoding circuit 600. In other words, the prediction units 612 and 620 have the same function, and therefore can act as the second decoding unit 504 and the third decoding unit 506 shown in FIG. 5. In addition, in this exemplary embodiment, the entropy decoding unit 602 acts as the first decoding unit 502 shown in FIG. 5. Therefore, the entropy decoding unit 602 sequentially performs the entropy decoding operation upon two pictures (e.g., P1 and P5, or B2 and B6) respectively included in the first and second bitstreams S1 and S2. Next, the prediction units 612 and 620 generate prediction results for the two pictures, respectively.

Figure 7:
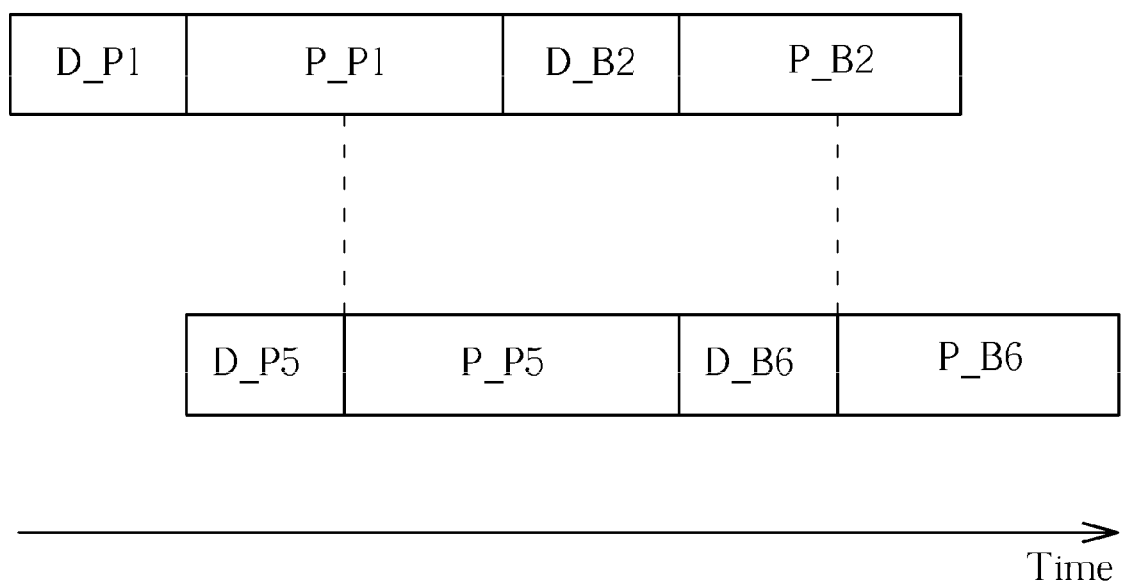
FIG. 7 is a diagram illustrating an exemplary operation of the decoding circuit shown in FIG. 6.

In a case where the prediction decoding is the performance bottleneck, multiple prediction units are used to improve the decoding performance. Please refer to FIG. 7, which is a diagram illustrating an exemplary operation of the decoding circuit 600 shown in FIG. 6. D_P1 represents a time period of performing the entropy decoding operation upon the P-picture P1 by the entropy decoding unit 602, D_B2 represents a time period of performing the entropy decoding operation upon the B-picture B2 by the entropy decoding unit 602, D_P5 represents a time period of performing the entropy decoding operation upon the P-picture P5 by the entropy decoding unit 602, and D_B6 represents a time period of performing the entropy decoding operation upon the B-picture B6 by the entropy decoding unit 602. In addition, P_P1 represents a time period of performing the prediction operation for the P-picture P1 by the prediction unit 612, P_B2 represents a time period of performing the prediction operation for the B-picture B2 by the prediction unit 612, P_P5 represents a time period of performing the prediction operation for the P-picture P5 by the prediction unit 620, and P_B6 represents a time period of performing the prediction operation for the B-picture B6 by the prediction unit 620. As can be seen from FIG. 7, time periods P_P1 and P_P5 are allowed to have an overlap in time due to the implemented multiple prediction units; additionally, time periods P_B2 and P_B6 are allowed to have an overlap in time due to the implemented multiple prediction units.

Figure 8:
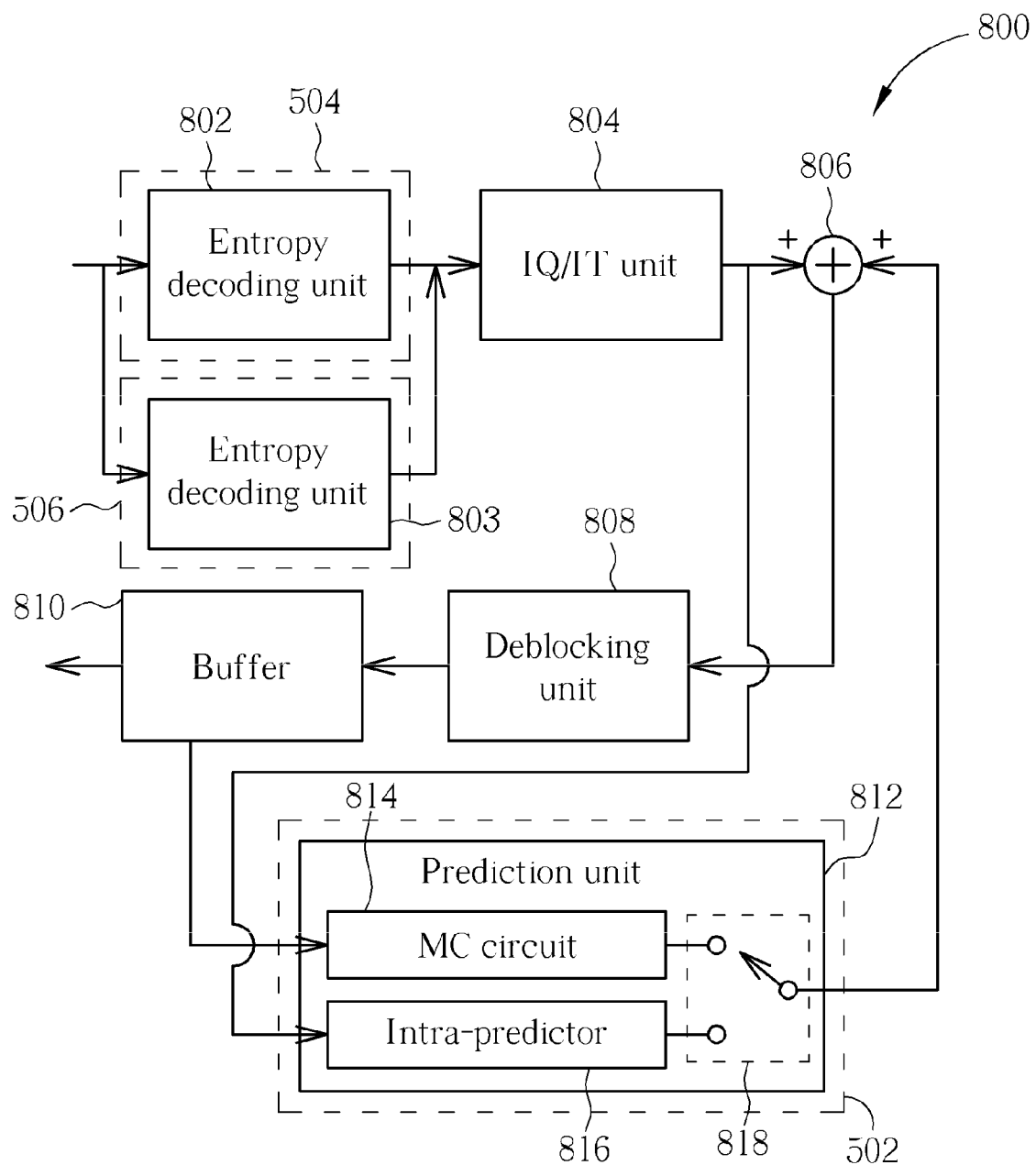
FIG. 8 is a simplified diagram illustrating a second exemplary decoding circuit with the architecture shown in FIG. 5 implemented therein.

FIG. 8 is a simplified diagram illustrating a second exemplary decoding circuit with the architecture shown in FIG. 5 implemented therein. The decoding circuit 800 includes a plurality of entropy decoding units (e.g., variable length decoders) 802 and 803, an IQ/IT unit 804, a reconstruction unit 806, a deblocking unit 808, a buffer 810 (which may be integrated in the output storage 106 shown in FIG. 1), and a prediction unit 812. The prediction unit 812 includes an MC circuit 814 for inter-prediction, an intra-predictor 816 for intra-prediction, and a multiplexer 818 for selecting one of the outputs generated from the MC circuit 814 and the intra-predictor 816 as its output to the reconstruction unit 806. As a person skilled in the H.264/AVC field can readily understand the operation and function of each block shown in FIG. 8, further description is omitted here for brevity. It should be noted that the entropy decoding unit 803 is a duplicate of the entropy decoding unit 802. The major difference between the decoding circuit 800 and the conventional decoder is the implementation of multiple entropy decoding units within the decoding circuit 600. In other words, the entropy decoding units 802 and 803 have the same function and therefore act as the second decoding unit 504 and the third decoding unit 506 shown in FIG. 5. In addition, in this exemplary embodiment, the prediction unit 812 acts as the first decoding unit 502 shown in FIG. 5. Therefore, the entropy decoding units 802 and 803 perform the entropy decoding operation upon two pictures (e.g., P1 and P5, or B2 and B6) respectively included in the first and second bitstreams S1 and S2, respectively. Next, the prediction unit 812 sequentially performs the prediction operation for the two pictures.

Figure 9:
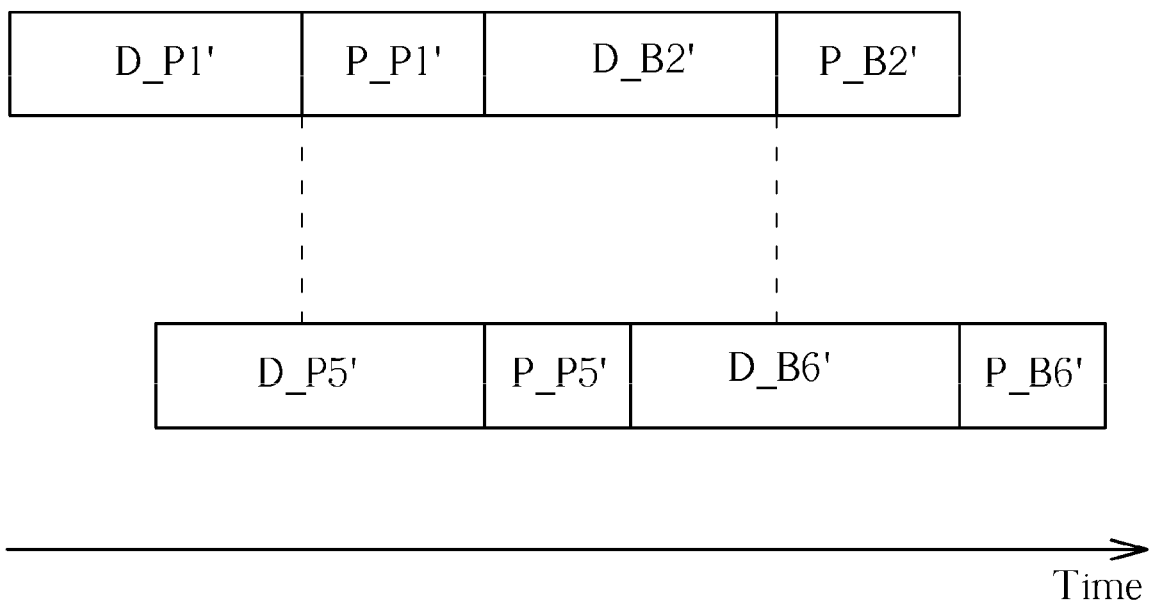
FIG. 9 is a diagram illustrating an exemplary operation of the decoding circuit shown in FIG. 8.

In a case where the entropy decoding is the performance bottleneck, multiple entropy decoding units are used to improve the decoding performance. Please refer to FIG. 9, which is a diagram illustrating an exemplary operation of the decoding circuit 800 shown in FIG. 8. D_P1' represents a time period of performing the entropy decoding operation upon the P-picture P1 by the entropy decoding unit 802, D_B2' represents a time period of performing the entropy decoding operation upon the B-picture B2 by the entropy decoding unit 802, D_P5' represents a time period of performing the entropy decoding operation upon the P-picture P5 by the entropy decoding unit 803, and D_B6' represents a time period of performing the entropy decoding operation upon the B-picture B6 by the entropy decoding unit 803. In addition, P_P1' represents a time period of performing the prediction operation for the P-picture P1 by the prediction unit 812, P_B2' represents a time period of performing the prediction operation for the B-picture B2 by the prediction unit 812, P_P5' represents a time period of performing the prediction operation for the P-picture P5 by the prediction unit 812, and P_B6' represents a time period of performing the prediction operation for the B-picture B6 by the prediction unit 812. As can be seen from FIG. 9, time periods D_P1' and D_P5' are allowed to have an overlap in time due to the implemented multiple entropy decoding units; additionally, time periods D_B2' and D_B6' are allowed to have an overlap in time due to the implemented multiple entropy decoding units.

Figure 10:
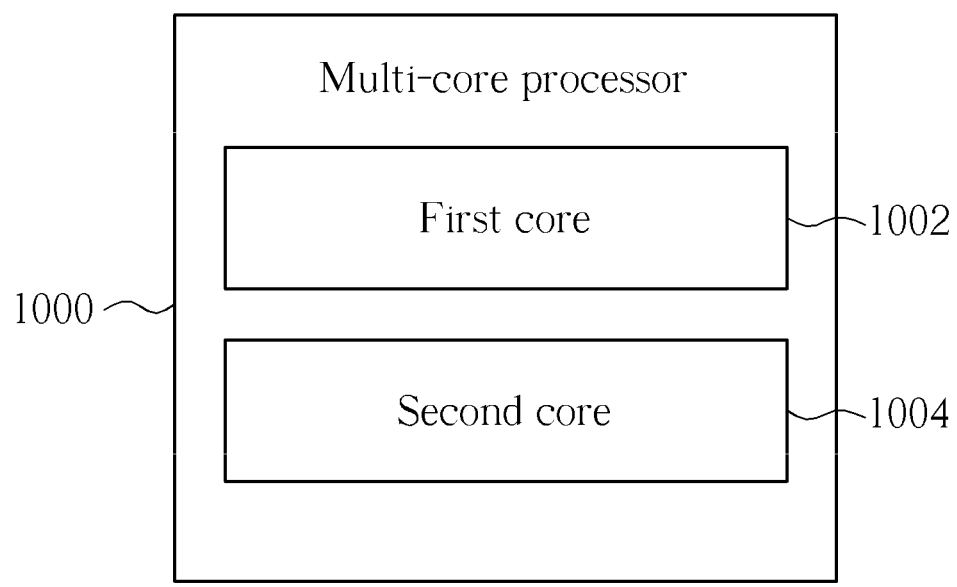
FIG. 10 is a diagram illustrating a third exemplary implementation of the decoding circuit shown in FIG. 1.

FIG. 10 is a diagram illustrating a third exemplary implementation of the decoding circuit 104 shown in FIG. 1. The decoding circuit 104 is implemented by a multi-core processor 1000 including a first core 1002 and a second core 1004. The multi-core processor 1000 may be programmed to realize the architecture shown in FIG. 4. For example, after a required decoded data derived from decoding the I-picture I0 is ready for a decoding operation of the P-picture P1 in the first bitstream S1, the first core 1002 is programmed to act as the first decoder 402 for performing the decoding operation of the P-picture P1 to thereby generate a corresponding reconstructed picture. In addition, after a required decoded data derived from decoding the I-picture I0 is ready for a decoding operation of the P-picture P5 in the second bitstream S2, the second core 1004 is programmed to act as the second decoder 404 for performing the decoding operation of the P-picture P5 to thereby generate a corresponding reconstructed picture. Similarly, after a required decoded data derived from decoding the P-pictures P1 and P5 is ready for a decoding operation of the B-picture B2 in the first bitstream S1, the first core 1002 is programmed to act as the first decoder 402 for performing the decoding operation of the B-picture B2 to thereby generate a corresponding reconstructed picture. In addition, after a required decoded data derived from decoding the P-pictures P1 and P5 is ready for a decoding operation of the B-picture B6 in the second bitstream S2, the second core 1004 is programmed to act as the second decoder 404 for performing the decoding operation of the B-picture B6 to thereby generate a corresponding reconstructed picture.

Alternatively, the multi-core processor 1000 may be programmed to realize the architecture shown in FIG. 5. As mentioned above, the decoding operation of the P-picture P1 may have at least a first decoding step and a second decoding step involved therein, and the decoding operation of the P-picture P5 may have at least a third decoding step and a fourth decoding step involved therein. Therefore, after a required decoded data derived from decoding the I-picture I0 is ready for the decoding operations of the P-pictures P1 and P5, the first core 1002 is programmed to act as the first decoding unit 502 for dealing with the first decoding step and the third decoding step by performing a first decoding function and also programmed to act as the second decoding unit 504 for dealing with the second decoding step by performing a second decoding function; and the second core 1004 is programmed to act as the third decoding unit 506 for dealing with the fourth decoding step by performing the second decoding function when the first core 1002 is programmed to deal with the second decoding step by performing the second decoding function.

Consider another case where the decoding operation of the B-picture B2 may have at least a first decoding step and a second decoding step involved therein, and the decoding operation of the B-picture B6 may have at least a third decoding step and a fourth decoding step involved therein. Therefore, after a required decoded data derived from decoding the P-pictures P1 and P5 is ready for the decoding operations of the B-pictures B2 and B6, the first core 1002 is programmed to act as the first decoding unit 502 for dealing with the first decoding step and the third decoding step by performing a first decoding function and also programmed to act as the second decoding unit 504 for dealing with the second decoding step by performing a second decoding function; and the second core 1004 is programmed to act as the third decoding unit 506 for dealing with the fourth decoding step by performing the second decoding function when the first core 1002 is programmed to deal with the second decoding step by performing the second decoding function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decoding method of an input video bitstream including a first bitstream and a second bitstream, each of the first bitstream and the second bitstream containing a plurality of pictures, the decoding method comprising:
   decoding a first picture in the first bitstream;
   after a required decoded data derived from decoding the first picture is ready for a first decoding operation of a second picture in the first bitstream, performing the first decoding operation; and
   after a required decoded data derived from decoding the first picture is ready for a second decoding operation of a picture in the second bitstream, performing the second decoding operation, wherein a time period of decoding the second picture in the first bitstream and a time period of decoding the picture in the second bitstream are overlapped in time.

2. The decoding method of claim 1, wherein the first bitstream is decoded without referencing decoded data derived from decoding the second bitstream, and the second bitstream is decoded by referencing decoded data derived from decoding the first bitstream.

3. The decoding method of claim 1, wherein the input video bitstream complies with a multi-view coding (MVC) standard.

4. The decoding method of claim 1, wherein the first bitstream contains pictures of a first view for a multi-dimensional video presentation, and the second bitstream contains pictures of a second view for the multi-dimensional video presentation.

5. A decoding apparatus of an input video bitstream including a first bitstream and a second bitstream, each of the first bitstream and the second bitstream containing a plurality of pictures, the decoding apparatus comprising:
   an input storage, for storing the input video bitstream;
   an output storage, for storing a decoded result of the input video bitstream; and
   a decoding circuit, coupled between the input storage and the output storage, for decoding a first picture in the first bitstream; performing a first decoding operation of a second picture in the first bitstream after a required decoded data derived from decoding the first picture is ready for the first decoding operation; and performing a second decoding operation of a picture in the second bitstream after a required decoded data derived from decoding the first picture is ready for the second decoding operation, wherein a time period of decoding the second picture in the first bitstream and a time period of decoding the picture in the second bitstream are overlapped in time.

6. The decoding apparatus of claim 5, wherein the decoding circuit comprises:
   a first decoder, for performing the first decoding operation to decode the second picture in the first bitstream; and
   a second decoder, for performing the second decoding operation to decode the picture in the second bitstream.

7. The decoding apparatus of claim 5, wherein the decoding circuit is a multi-core processor comprising:
   a first core, programmed to perform the first decoding operation to decode the second picture in the first bitstream; and a second core, programmed to perform the second decoding operation to decode the picture in the second bitstream.

8. The decoding apparatus of claim 5, wherein the first decoding operation has a first decoding step and a second decoding step involved therein; the second decoding operation has a third decoding step and a fourth decoding step involved therein; and the decoding circuit comprises:
a first decoding unit, dedicated to performing a first decoding function, wherein the first decoding unit sequentially deals with the first decoding step and the third decoding step by performing the first decoding function;
a second decoding unit, dedicated to performing a second decoding function; and
a third decoding unit, dedicated to performing the second decoding function, wherein when the second decoding unit deals with the second decoding step by performing the second decoding function, the third decoding unit deals with the fourth decoding step by performing the second decoding function.

9. The decoding apparatus of claim 5, wherein the first decoding operation has a first decoding step and a second decoding step involved therein; the second decoding operation has a third decoding step and a fourth decoding step involved therein; and the decoding circuit is a multi-core processor comprising:
a first core, programmed to sequentially deal with the first decoding step and the third decoding step by performing a first decoding function, and further programmed to deal with the second decoding step by performing a second decoding function; and
a second core, programmed to deal with the fourth decoding step by performing the second decoding function when the first core deals with the second decoding step by performing the second decoding function.

10. The decoding apparatus of claim 5, wherein the first bitstream is decoded without referencing decoded data derived from decoding the second bitstream, and the second bitstream is decoded by referencing decoded data derived from decoding the first bitstream.

11. The decoding apparatus of claim 5, wherein the input video bitstream complies with a multi-view coding (MVC) standard.

12. The decoding apparatus of claim 5, wherein the first bitstream contains pictures of a first view for a multi-dimensional video presentation, and the second bitstream contains pictures of a second view for the multi-dimensional video presentation.

13. A decoding method of an input video bitstream including a first bitstream and a second bitstream, each of the first bitstream and the second bitstream containing a plurality of pictures, the decoding method comprising:
decoding a first picture in the first bitstream;
decoding a first picture in the second bitstream;
after a required decoded data derived from decoding the first picture in the first bitstream and the first picture in the second bitstream is ready for a first decoding operation of a second picture in the first bitstream, performing the first decoding operation; and
after a required decoded data derived from decoding the first picture in the first bitstream and the first picture in the second bitstream is ready for a second decoding operation of a second picture in the second bitstream, performing the second decoding operation, wherein the second decoding operation of the second picture in the second bitstream at least refers to both of decoded data deriving from decoding the first picture in the first bitstream and decoded data deriving from decoding the first picture in the second bitstream, and a time period of decoding the second picture in the first bitstream and a time period of decoding the second picture in the second bitstream are overlapped in time.

14. The decoding method of claim 13, wherein the first bitstream is decoded without referencing decoded data derived from decoding the second bitstream, and the second bitstream is decoded by referencing decoded data derived from decoding the first bitstream.

15. The decoding method of claim 13, wherein the input video bitstream complies with a multi-view coding (MVC) standard.

16. The decoding method of claim 13, wherein the first bitstream contains pictures of a first view for a multi-dimensional video presentation, and the second bitstream contains pictures of a second view for the multi-dimensional video presentation.

17. A decoding apparatus of an input video bitstream including a first bitstream and a second bitstream, each of the first bitstream and the second bitstream containing a plurality of pictures, the decoding apparatus comprising:
an input storage, for storing the input video bitstream;
an output storage, for storing a decoded result of the input video bitstream; and
a decoding circuit, coupled between the input storage and the output storage, for decoding a first picture in the first bitstream; decoding a first picture in the second bitstream; performing a first decoding operation of a second picture in the first bitstream after a required decoded data derived from decoding the first picture in the first bitstream and the first picture in the second bitstream is ready for the first decoding operation; and performing a second decoding operation of a second picture in the second bitstream after a required decoded data derived from decoding the first picture in the first bitstream and the first picture in the second bitstream is ready for the second decoding operation, wherein the second decoding operation of the second picture in the second bitstream at least refers to both of decoded data deriving from decoding the first picture in the first bitstream and decoded data deriving from decoding the first picture in the second bitstream, and a time period of decoding the second picture in the first bitstream and a time period of decoding the second picture in the second bitstream are overlapped in time.

18. The decoding apparatus of claim 17, wherein the decoding circuit comprises:
a first decoder, for performing the first decoding operation to decode the second picture in the first bitstream; and
a second decoder, for performing the second decoding operation to decode the second picture in the second bitstream.

19. The decoding apparatus of claim 17, wherein the decoding circuit is a multi-core processor comprising:
a first core, programmed to perform the first decoding operation to decode the second picture in the first bitstream; and
a second core, programmed to perform the second decoding operation to decode the second picture in the second bitstream.

20. The decoding apparatus of claim 17, wherein the first decoding operation has a first decoding step and a second decoding step involved therein; the second decoding operation has a third decoding step and a fourth decoding step involved therein; and the decoding circuit comprises:

a first decoding unit, dedicated to performing a first decoding function, wherein the first decoding unit sequentially deals with the first decoding step and the third decoding step by performing the first decoding function;

a second decoding unit, dedicated to performing a second decoding function; and a third decoding unit, dedicated to performing the second decoding function, wherein when the second decoding unit deals with the second decoding step by performing the second decoding function, the third decoding unit deals with the fourth decoding step by performing the second decoding function.

21. The decoding apparatus of claim 17, wherein the first decoding operation has a first decoding step and a second decoding step involved therein; the second decoding operation has a third decoding step and a fourth decoding step involved therein; and the decoding circuit is a multi-core processor comprising:

a first core, programmed to sequentially deal with the first decoding step and the third decoding step by performing a first decoding function, and further programmed to deal with the second decoding step by performing a second decoding function; and a second core, programmed to deal with the fourth decoding step by performing the second decoding function when the first core deals with the second decoding step by performing the second decoding function.

22. The decoding apparatus of claim 17, wherein the first bitstream is decoded without referencing decoded data derived from decoding the second bitstream, and the second bitstream is decoded by referencing decoded data derived from decoding the first bitstream.

23. The decoding apparatus of claim 17, wherein the input video bitstream complies with a multi-view coding (MVC) standard.

24. The decoding apparatus of claim 17, wherein the first bitstream contains pictures of a first view for a multi-dimensional video presentation, and the second bitstream contains pictures of a second view for the multi-dimensional video presentation.

* * * * *